US009117136B2

(12) United States Patent
Jang et al.

(10) Patent No.: US 9,117,136 B2
(45) Date of Patent: Aug. 25, 2015

(54) IMAGE PROCESSING METHOD AND IMAGE PROCESSING APPARATUS

(75) Inventors: Soon-geun Jang, Seongnam-si (KR); Rae-hong Park, Seoul (KR); Young-il Pyo, Anyang-si (KR)

(73) Assignees: Samsung Electronics Co., Ltd., Suwon-si (KR); Industry-University Cooperation Foundation Sogang University, Seoul (KR)

( * ) Notice: Subject to any disclaimer, the term of this patent is extended or adjusted under 35 U.S.C. 154(b) by 228 days.

(21) Appl. No.: 13/591,449

(22) Filed: Aug. 22, 2012

(65) Prior Publication Data

US 2013/0071025 A1 Mar. 21, 2013

(30) Foreign Application Priority Data

Sep. 21, 2011 (KR) ........................ 10-2011-0095233

(51) Int. Cl.
*G06K 9/34* (2006.01)
*G06K 9/40* (2006.01)
*G06T 5/00* (2006.01)
*H04N 1/58* (2006.01)
*H04N 5/217* (2011.01)
*H04N 9/04* (2006.01)

(52) U.S. Cl.
CPC . *G06K 9/40* (2013.01); *G06T 5/002* (2013.01); *H04N 1/58* (2013.01); *G06T 2207/20064* (2013.01); *G06T 2207/20192* (2013.01); *H04N 5/217* (2013.01); *H04N 9/045* (2013.01)

(58) Field of Classification Search
USPC ......... 382/154, 164, 167, 174, 175, 260, 284; 358/3.26, 3.27, 520, 540, 463
See application file for complete search history.

(56) References Cited

U.S. PATENT DOCUMENTS

| 6,993,204 | B1 * | 1/2006 | Yahil et al. | 382/265 |
|---|---|---|---|---|
| 7,076,113 | B2 * | 7/2006 | Le Dinh | 382/261 |
| 7,184,814 | B2 * | 2/2007 | Lang et al. | 600/416 |
| 7,477,777 | B2 * | 1/2009 | Wells | 382/154 |
| 7,576,332 | B2 * | 8/2009 | Britten | 250/393 |
| 7,630,543 | B2 * | 12/2009 | Wilensky et al. | 382/162 |
| 7,792,361 | B2 * | 9/2010 | Wilensky et al. | 382/173 |
| 7,876,974 | B2 * | 1/2011 | Brajovic | 382/264 |
| 8,149,336 | B2 * | 4/2012 | Mohanty et al. | 348/607 |
| 8,488,863 | B2 * | 7/2013 | Boucheron | 382/133 |
| 8,582,666 | B2 * | 11/2013 | Zuo et al. | 375/240.29 |
| 8,620,055 | B2 * | 12/2013 | Barratt et al. | 382/131 |
| 8,886,283 | B1 * | 11/2014 | Chen et al. | 600/410 |

* cited by examiner

*Primary Examiner* — Yosef Kassa
(74) *Attorney, Agent, or Firm* — Drinker Biddle & Reath LLP (57) ABSTRACT

An image processing method and an image processing apparatus for removing noise from an image are disclosed. A provided image processing method includes: dividing an input image into a luminance signal and a chrominance signal; removing noise from the luminance signal; restoring luminance signal present in the noise removed from the luminance signal; removing noise from the chrominance signal; and combining the luminance signal and the chrominance signal from which the noises are removed. Accordingly, an image of which an edge component is well preserved and a degree of color noise is low is generated not only in a general environment but also in a low light level and high sensitivity environment having a large amount of noise.

17 Claims, 9 Drawing Sheets

IMAGE PROCESSING METHOD AND IMAGE PROCESSING APPARATUS

CROSS-REFERENCE TO RELATED PATENT APPLICATION

This application claims the priority benefit of Korean Patent Application No. 10-2011-0095233, filed on Sep. 21, 2011, in the Korean Intellectual Property Office, which is incorporated herein in its entirety by reference.

BACKGROUND

1. Field of the Invention

The invention relates to an image processing method and an image processing apparatus for removing noise in an image.

2. Description of the Related Art

Examples of conventional techniques of removing noise include a method of removing noise with respect to each subband on a transform plane using a multi-resolution image separating technique, and a method of removing noise by dividing an image into blocks and gathering similar blocks. However, unlike noise in an actual image, conventional techniques assume independent Gaussian noise. Since noise in a captured image is signal dependent noise, it is difficult to remove using conventional techniques. Block matching in three dimension (BM3D) and video block matching in three dimension (VBM3D) methods from among conventional techniques remove noise in an image in 2 stages, but a second stage has high computational requirements and is difficult to realize in hardware. Also, while noise in a luminance channel may be well removed from an image, the noise in the luminance channel has to be repeatedly calculated in the second stage. In addition, a noise brush method is a post process method that can be used only on an image from which noise is primarily removed, and thus a user has to manually designate an area to apply the noise brush method.

SUMMARY

The invention provides an image processing method and an image processing apparatus for removing noise in an image generated not only in a general environment but also in a low light level and high sensitivity (i.e., high ISO setting) environment.

According to an aspect of the invention, there is provided an image processing method including: dividing an input image into a luminance signal and a chrominance signal; removing noise from the luminance signal; restoring luminance signal present in the noise removed from the luminance signal; removing noise from the chrominance signal; and combining the luminance signal and the chrominance signal from which the noises are removed.

The removing of the noise from the luminance signal may include: grouping blocks whose similarities are smaller than a threshold value via block matching; 3 dimensional (3D) wavelet transforming the grouped blocks to form 3D wavelet coefficients; 3D thresholding the 3D wavelet coefficients; inverse 3D wavelet transforming the thresholded 3D wavelet coefficients to form inverse 3D wavelet transformed blocks; and restoring the inverse 3D wavelet transformed blocks to their original locations.

The grouping of the blocks may include: dividing the luminance signal into a plurality of blocks; setting a plurality of reference blocks from among the plurality of blocks; scanning the plurality of blocks of the luminance signal using the plurality of reference blocks; and grouping blocks of which a difference between the plurality of scanned blocks and the plurality of reference blocks is smaller than a threshold value.

The 3D thresholding may include setting the 3D wavelet coefficients disposed between absolute values of the threshold value to zero.

A weighted average value may be applied to the grouped blocks that are repeatedly used as the plurality of reference blocks during the restoring of the inverse 3D wavelet transformed blocks to their original locations.

The restoring of the luminance signal may include: detecting an edge from the luminance signal from which the noise is removed; generating an area to be filtering by extending the detected edge; extracting a removed block by using a gradient vector component and a bilateral filtering unit component of a block corresponding to a difference between a grouped block having high similarity via block matching and a grouped block having high similarity from which noise is removed, in the area to be filtering; and restoring the extracted removed block to the luminance signal.

The removing of the noise of the chrominance signal may include: wavelet transforming the chrominance signal; dividing the wavelet transformed chrominance signal into a high frequency component and a low frequency component; removing noise from the low frequency component; removing noise from the high frequency component; combining the low frequency component and high frequency component from which the noises are removed to form a combined signal; and inverse wavelet transforming the combined signal.

The removing of the noise from the low frequency component may include: grouping blocks whose similarities are smaller than a threshold value via block matching; 3D wavelet transforming the grouped blocks to form 3D wavelet coefficients; 3D thresholding the 3D wavelet coefficients; inverse 3D wavelet transforming the thresholded 3D wavelet coefficients to form inverse 3D wavelet transformed blocks; and restoring the inverse 3D wavelet transformed blocks to their original locations.

The grouping of the blocks may include: dividing the low frequency component into a plurality of blocks; setting a plurality of reference blocks from among the plurality of blocks; scanning the luminance signal; and removing blocks of which a difference between the scanned blocks and the plurality of reference blocks is smaller than a threshold value.

The 3D thresholding may include setting the 3D wavelet coefficients disposed between absolute values of the threshold value to zero.

A weighted average value may be applied to the grouped blocks that are repeatedly used as the plurality of reference blocks during the restoring of the inverse 3D wavelet transformed blocks to original locations.

The removing of the noise of the high frequency component may include: removing the high frequency component disposed between absolute values of the threshold value.

According to another aspect of the invention, there is provided an image processing apparatus including: a divider to divide an input image into a luminance signal and a chrominance signal; a first noise remover to remove noise from the luminance signal and restore luminance signal present in the noise removed from the luminance signal; a second noise remover to remove noise from the chrominance signal; and an output unit to combine and output the luminance signal and the chrominance signal from which the noises are removed.

The image processing apparatus may further include a converter to convert a color signal of the input image into the luminance signal and the chrominance signal.

The first noise remover may include: a block matcher to group blocks whose similarities are smaller than a threshold value via block matching; a converter to 3 dimensional (3D) wavelet transform the grouped blocks to form 3D wavelet coefficients; a thresholding unit to 3D threshold the 3D wavelet coefficients; an inverse converter to inverse 3D wavelet transform the thresholded 3D wavelet coefficients to form inverse 3D wavelet transformed blocks; and a restorer to restore the inverse 3D wavelet transformed blocks to their original locations.

The first noise remover may include: a detector to detect an edge from the luminance signal from which the noise is removed; a generator to generate an area to be filtering united by extending the detected edge; a filtering unit to extract a removed block using a gradient vector component and a bilateral filtering unit component of a block corresponding to a difference between a grouped block having high similarity via block matching and a grouped block having high similarity from which noise is removed, in the area to be filtered; and a restorer to restore the extracted removed block to the luminance signal.

The second noise remover may include: a converter to wavelet transform the chrominance signal; a divider to divide the wavelet transformed chrominance signal into a high frequency component and a low frequency component; a first filtering unit to remove noise from the low frequency component; a second filtering unit to remove noise from the high frequency component; a combiner to combine the low frequency component and high frequency component from which the noises are removed to form a combined signal; and an inverse converter to inverse wavelet transform the combined signal.

The first filtering unit may include: a block matcher to group blocks whose similarities are smaller than a threshold value via block matching; a converter to 3D wavelet transform the grouped blocks to form 3D wavelet coefficients; a thresholding unit to 3D threshold the 3D wavelet coefficients; an inverse converter to inverse 3D wavelet transform the thresholded 3D wavelet coefficients to form inverse 3D wavelet transformed blocks; and a restorer to restore the inverse 3D wavelet transformed blocks to their original locations.

The second filtering unit may remove the high frequency component disposed between absolute values of the threshold value.

BRIEF DESCRIPTION OF THE DRAWINGS

The above and other features and advantages of the invention will become more apparent in review of detail exemplary embodiments thereof with reference to the attached drawings, in which.

DETAILED DESCRIPTION

As the invention allows for various changes and numerous embodiments, particular embodiments will be illustrated in the drawings and described in detail in the written description. However, these do not limit the invention to particular modes of practice, and it will be appreciated that all changes, equivalents, and substitutes that do not depart from the spirit and technical scope of this disclosure are encompassed in the invention. In the description of the invention, certain detailed explanations are omitted when it is deemed that they may unnecessarily obscure the essence of the invention.

While such terms as "first," "second," etc., may be used to describe various components, such components must not be limited to the above terms. The above terms are used only to distinguish one component from another.

The terms used in the present specification are merely used to describe particular embodiments, and are not intended to limit the invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Embodiments of the invention will be described below in more detail with reference to the accompanying drawings. Those components that are the same or are in correspondence are designated with the same reference numeral regardless of the figure number, and redundant explanations are omitted.

Figure 1:
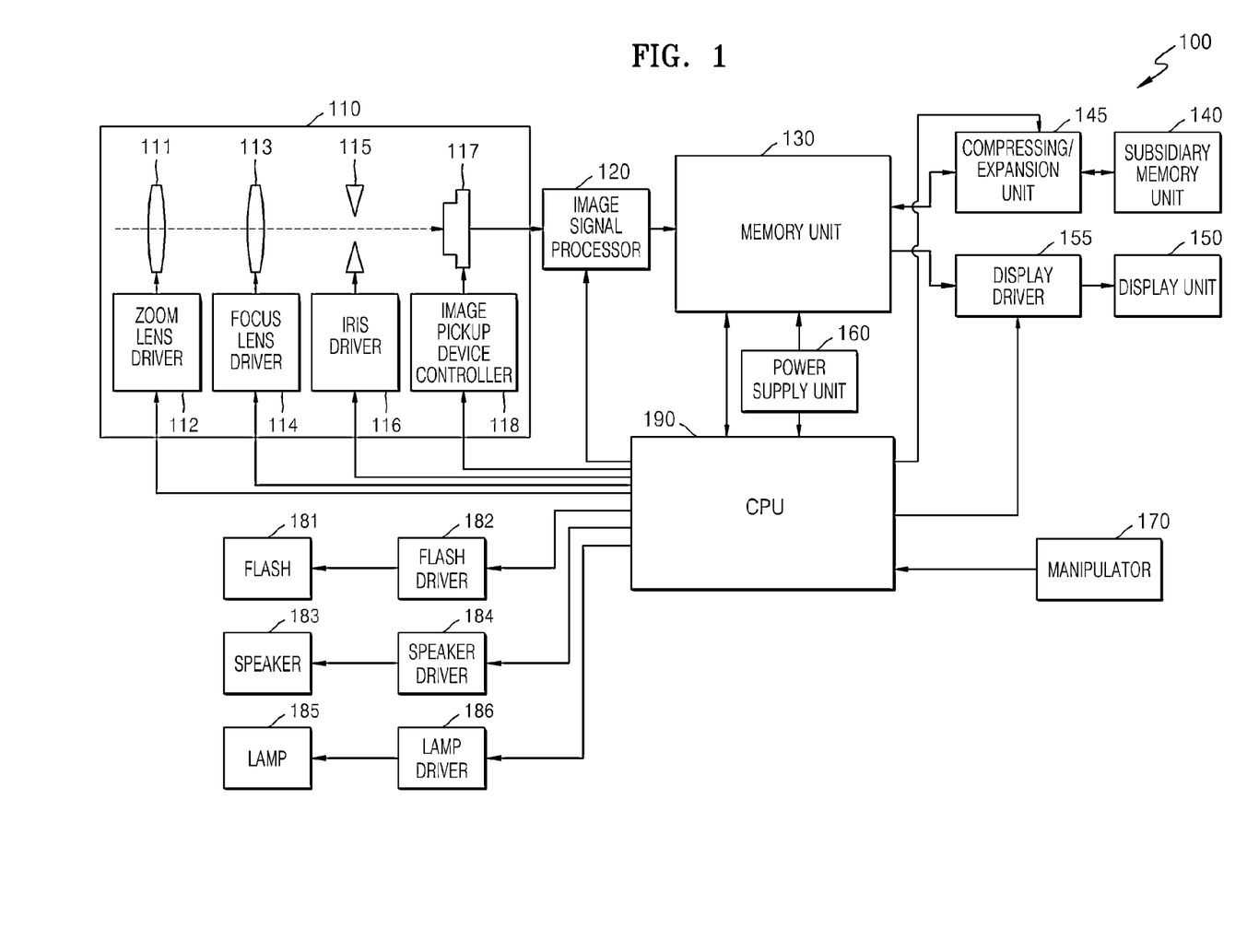
FIG. 1 is a block diagram of an image processing apparatus, according to an embodiment of the invention.

FIG. 1 is a block diagram of an image processing apparatus, according to an embodiment of the invention. In FIG. 1, a digital camera 100 is illustrated as an example of the image processing apparatus. However, the image processing apparatus is not limited to the digital camera 100, and may be a digital single-lens reflex camera (DSLR), a hybrid camera, or any other device capable of processing images. Moreover, the disclosed image processing apparatus and methods may be implemented separately from a device used to capture or obtain an image from which noise is to be removed. A structure of the digital camera 100 of FIG. 1 will now be described in detail according to operations.

When a subject is photographed, light reflected by the subject passes through a zoom lens 111 and a focus lens 113, which are part of an optical system of an imaging unit 110. An amount of the light passing through the imaging unit 110 is adjusted according to a degree of opening and shutting of an iris 115. An image of the subject is formed on a light-receiving surface of an image pickup device 117. The image formed on the light-receiving surface of the image pickup device 117 is converted into an electric image signal via a photoelectric conversion process.

The image pickup device 117 may be a charge coupled device (CCD) or a complementary metal oxide semiconductor image sensor (CIS), which converts an optical signal to an electric signal. The iris 115 may be in a general state or in an open state while auto focusing is being performed when a release button is half-pressed. Also, an exposure process may be performed when the release button is fully pressed.

Locations or the like of the zoom lens 111 and the focus lens 113 are respectively controlled by a zoom lens driver 112 and a focus lens driver 114. For example, when a wide angle-zoom signal is received, a view angle increases as a focal length of the zoom lens 111 is decreased, and when a tele-photo-zoom signal is received, a view angle is decreased as the focal length of the zoom lens 111 is increased. Because the location of the focus lens 113 is adjusted while the location of the zoom lens 111 remains fixed, the view angle is substantially unaffected by the location of the focus lens 113. The degree of opening and shutting or the like of the iris 115 is controlled by an iris driver 116. Sensitivity or the like of the image pickup device 117 is controlled by an image pickup device controller 118.

The zoom lens driver 112, the focus lens driver 114, the iris driver 116, and the image pickup device controller 118 control respective components according to results calculated by a central processing unit (CPU) 190 based on exposure information, focus information, etc.

An image signal output from the image pickup device 117 is input to an image signal processor 120. When the image signal input from the image pickup device 117 is an analog signal, the image signal processor 120 converts the image signal into a digital signal. The image signal processor 120 performs various image processes on the image signal. The processed digital signal is temporarily stored in a memory unit 130.

In detail, the image signal processor 120 performs auto white balance, converts image data according to a visual angle of a person, or performs signal processes, such as auto exposure or gamma correction, to improve the quality of an image signal, and outputs the image signal having the improved quality. Also, the image signal processor 120 performs an image process, such as color filtering unit array interpolation, color matrix, color correction, or color enhancement.

Specifically, the image signal processor 120 converts an RGB input image signal into an YCbCr input image signal, and divides (e.g., separates) the YCbCr input image signal into a luminance signal (Y) and a chrominance signal (CbCr). Then, noise is removed from the luminance signal, any luminance signal present in the removed noise is restored (e.g., added back to the luminance signal from which the noise has been removed), noise is removed from the chrominance signal, and a final image signal is generated by combining the luminance signal and chrominance signal from which the noises have been removed. Operations of the image signal processor 120 will be described in detail later with reference to FIGS. 2 through 7.

The memory unit 130 may include a program memory unit in which a program about operation of the digital camera 100 is stored regardless of power supply status, and a main memory unit in which the image data and other data are temporarily stored while power is supplied.

The program memory unit stores an operating program and various application programs for control and operation of the digital camera 100. The CPU 190 controls each component according to programs stored in the program memory unit.

The main memory unit temporarily stores an image signal output from the image signal processor 120 or a subsidiary memory unit 140.

The main memory unit may be directly connected to a power supply unit 160, separately from the digital camera 100 being supplied with power to be operated. Accordingly, code stored in the program memory unit may be copied to and converted into a code executable by the main memory unit so that the digital camera 100 may be quickly booted, and data stored in the main memory unit may be quickly read when the digital camera 100 is booted.

The image signal stored in the main memory unit is output to a display driver 155, and at the same time, is converted into an image signal suitable for display. The converted image signal may be displayed on a display unit 150 to be shown to a user as an image. During a photographing mode, the display unit 150 may operate as a view finder for determining a photographing range by continuously displaying the image signals obtained by the image pickup device 117. Examples of the display unit 150 include a liquid crystal display (LCD), an organic light emitting display (OLED), or an electro-phoretic display device (EDD).

When the image signal generated as above is recorded, the image signal is temporarily stored in the memory unit 130, and at this time, the subsidiary memory unit 140 stores not only the image signal but also various types of information about the image signal. Also, the stored image signal and information are output to a compressing/expansion unit 145. The compressing/expansion unit 145 forms an image file, such as a Joint Photographic Experts Group (JPEG) file, by performing a compressing process, such as an encoding process, on the image signal and information so that they are in a format for efficient storage, by using a compressing circuit, and the image file is stored in the subsidiary memory unit 140.

The subsidiary memory unit 140 may be a fixed type semiconductor memory such as an external flash memory, a card type flash memory having a card shape or a stick shape and freely detachable from a device, a magnetic storage media such as a hard disk or a floppy disk, or an optical storage media.

When an image is reproduced, the image file compressed and recorded on the subsidiary memory unit 140 is output to the compressing/expansion unit 145, and an image signal is extracted from the image file as the compressing/expansion unit 145 performs an extending process, i.e., a decoding or decompression process, on the image file by using an extending circuit. Then, the image signal is output to the memory unit 130. The image signal is temporarily stored in the memory unit 130, and then may be reproduced as an image by the display unit 150 through the display driver 155.

Meanwhile, the digital camera 100 includes a manipulator 170 for receiving external signals or inputs from a user or the like. The manipulator 170 includes various functional buttons, such as a shutter release button for opening and closing a shutter to expose the image pickup device 117 to light for a predetermined time, a power supply button for controlling power supply to the digital camera 100, a wide angle-zoom button and a telephoto-zoom button for respectively increasing or decreasing an angle of view, a mode selecting button for selecting a character input mode, a photographing mode, a reproducing mode, a white balance setting button, and an exposure setting button.

Also, the digital camera 100 includes a flash 181 and a flash driver 182 for driving the flash 181. The flash 181 is a light emitting device that momentarily illuminates the subject when the subject is in a dark place.

A speaker 183 and a lamp 185 may notify the user about an operating state or the like of the digital camera 100 by respectively outputting an audio signal and a light signal. Specifically, if photographing conditions at a point of time when the user sets a photographing parameter and a point of time when photographing is performed are different in a manual mode, a notifying signal may be realized as an alarm or an optical signal through the speaker 183 or the lamp 185, respectively. A type and volume of the audio signal of the speaker 183 are controlled by a speaker driver 184, and light emission, a time of light emission, and a type of light emission of the lamp 185 are controlled by a lamp driver 186.

The CPU 190 performs operations according to the operating and application programs stored in the memory unit 130, temporarily stores the results of the operations, and operates the digital camera 100 as above by controlling corresponding components according to the results.

The image signal processor 120 of FIG. 1 according to an embodiment of the invention will now be described with reference to FIGS. 2 through 7.

Figure 2:
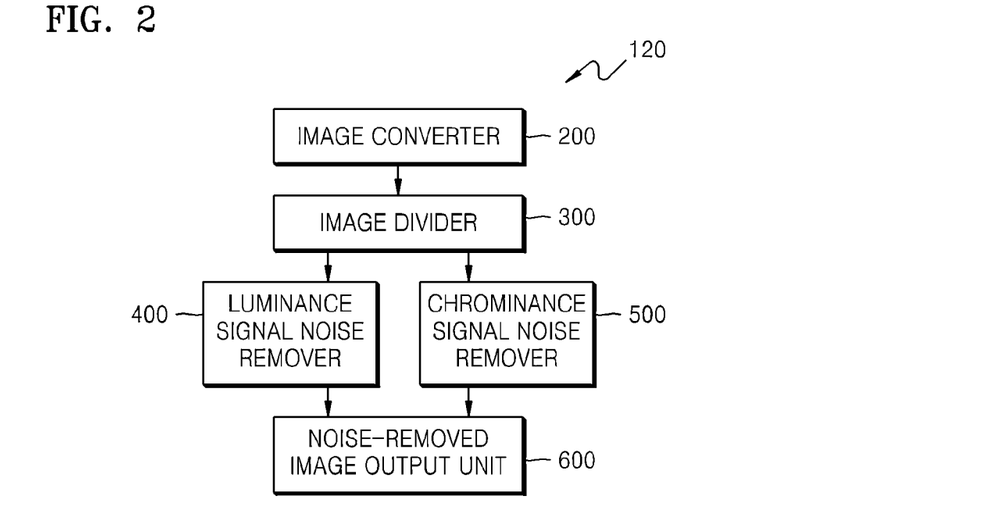
FIG. 2 is a block diagram of the image signal processor of FIG. 1, according to an embodiment of the invention.

Referring to FIG. 2, the image signal processor 120 includes an image converter 200, an image divider 300, a luminance signal noise remover 400, a chrominance signal noise remover 500, and a noise-removed image output unit 600.

The image converter 200 converts an RGB input image signal to an YCbCr input image signal. While removing noise, it is more effective to remove noise from an YCbCr plane than an RGB plane having high correlation.

The image divider 300 divides the YCbCr input image signal into a luminance signal $i^Y$ and a chrominance signal $i^C$. Noise in a color image has different characteristics in a luminance component and a chrominance component. Luminance noise has a smaller size and more high frequency components than chrominance noise. On the other hand, chrominance noise has a larger size due to high spatial correlation and more low frequency components than luminance noise. Accordingly, the luminance noise and the chrominance noise are separately handled to increase noise removal.

Figure 3:
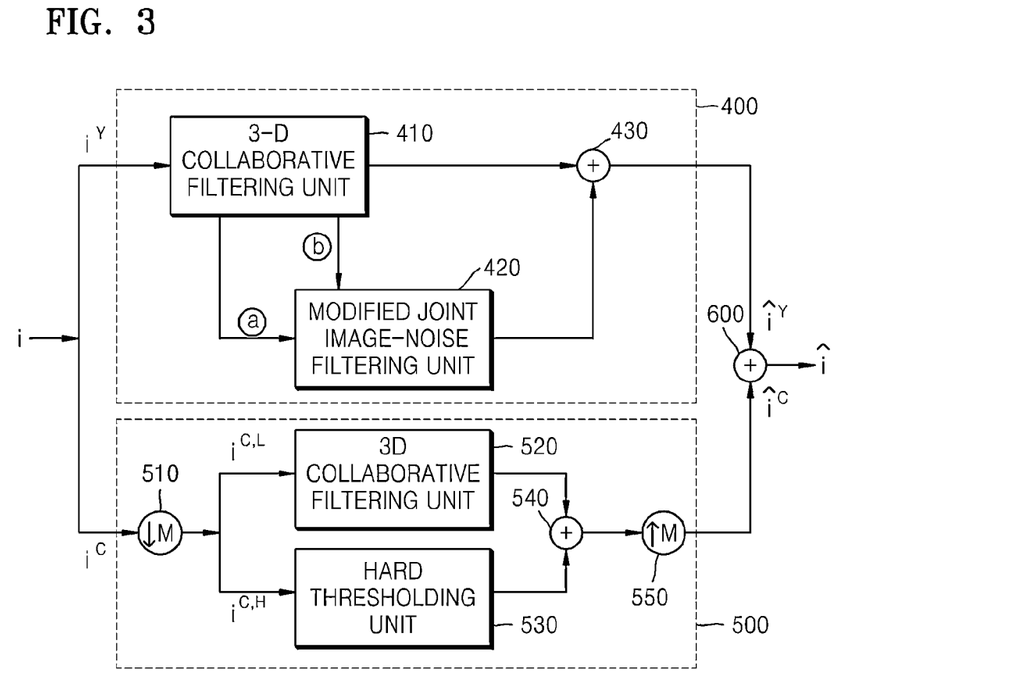
FIG. 3 is a detailed diagram of the luminance signal noise remover and the chrominance signal noise remover of FIG. 2.

The luminance signal noise remover 400 removes noise from the luminance signal $i^Y$, and restores any luminance signal $i^Y$ present in the removed noise (e.g., adds the inadvertently removed luminance signal $i^Y$ back to the luminance signal $i^Y$ from which the noise has been removed). The chrominance signal noise remover 500 removes noise from the chrominance signal $i^C$. FIG. 3 is a detailed diagram of the luminance signal noise remover 400, the chrominance signal noise remover 500, and the noise-removed image output unit 600 of FIG. 2.

Referring to FIG. 3, the luminance signal noise remover 400 includes a 3D collaborative filtering unit 410, a modified joint image-noise filtering unit 420, and a combiner 430. First, removing of luminance noise will be described with reference to FIGS. 3 through 6.

Figure 4:
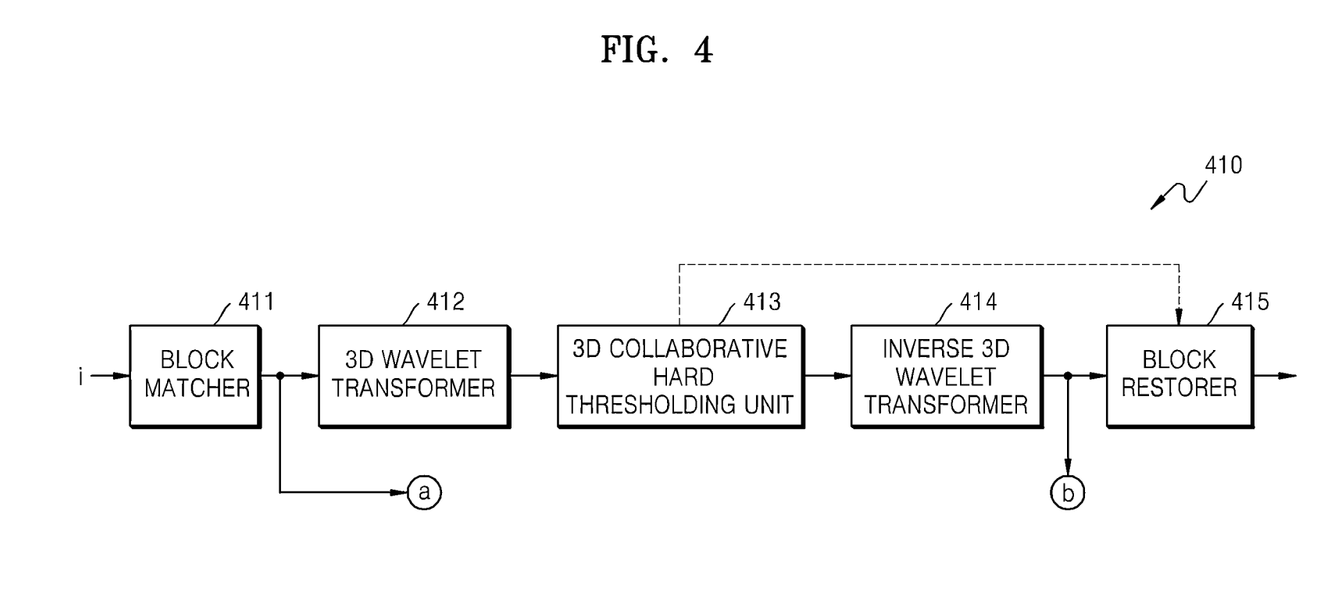
FIG. 4 is a detailed diagram of the 3D collaborative filtering unit of FIG. 3.

The 3D collaborative filtering unit 410 first removes noise by performing block matching on an image of the luminance signal $i^Y$, groups similar blocks, and applies 3D collaborative filtering. FIG. 4 is a detailed diagram of the 3D collaborative filtering unit 410 in FIG. 3.

Referring to FIG. 4, the 3D collaborative filtering unit 410 includes a block matcher 411, a 3D wavelet transformer 412, a 3D collaborative hard thresholding unit 413, an inverse 3D wavelet transformer 414, and a block restorer 415.

The block matcher 411 groups blocks whose similarities are smaller than a threshold value via block matching of the image of the luminance signal $i^Y$. The block matcher 411 first divides the image of the luminance signal $i^Y$ into a plurality of (N×N) blocks, and sets a plurality of reference blocks. The block matcher 411 scans the image of the luminance signal $i^Y$ using the reference blocks, compares each block and the threshold value, determines that blocks whose similarities are smaller than the threshold value have high similarity, and groups the blocks having high similarity. However, blocks whose similarities are larger than the threshold value are determined to have low similarity, and are maintained. In other words, the block matcher 411 gathers 2D image blocks having high similarity, and forms a 3D image block. Here, the 3D image block denotes the grouped blocks whose similarities are smaller than the threshold value.

The 3D wavelet transformer 412 performs 3D wavelet transformation on the grouped blocks whose similarities are smaller than the threshold value output from the block matcher 411. The 3D wavelet transformer 412 outputs 3D wavelet coefficients for the grouped blocks by performing 2D biorthogonal wavelet transformation on each block and 1D Haar wavelet transformation on the group of blocks. Because biorthogonal wavelet transformation and Haar wavelet transformation are well known in the art, details thereof will not be described herein.

Figure 5:
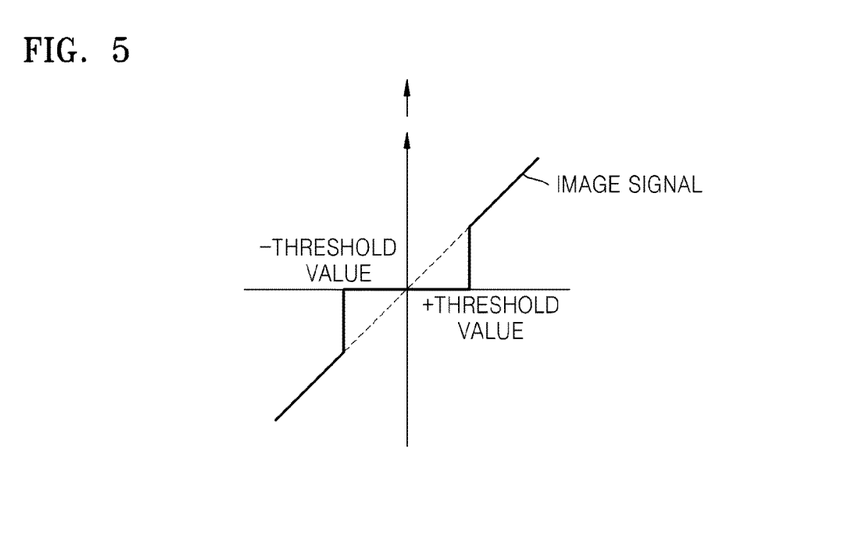
FIG. 5 is a diagram for describing hard thresholding.

The 3D collaborative hard thresholding unit 413 performs hard thresholding on the 3D wavelet coefficients of the grouped blocks output from the 3D wavelet transformer 412. FIG. 5 is a diagram for describing hard thresholding, wherein the 3D collaborative hard thresholding unit 413 sets a threshold value (for example, 15), determines that 3D wavelet coefficients disposed between absolute values of the threshold value, i.e., between a negative threshold value and a positive threshold value (for example, between −15 and +15), represent noise and removes the noise by setting the 3D wavelet coefficients to zero, and determines that 3D wavelet coefficients disposed other than between the absolute values of the threshold value represent an effective image (e.g., do not contain substantially amounts of noise) and maintains the effective image (i.e., does not modify the 3D wavelet coefficients).

Returning to FIG. 4, the inverse 3D wavelet transformer 414 performs inverse 3D wavelet transformation on the hard thresholded 3D wavelet coefficients representing the grouped blocks from which noise has been removed and which is output from the 3D collaborative hard thresholding unit 413.

The block restorer 415 restores the inverse 3D wavelet transformed grouped blocks to original locations. Here, the block restorer 415 restores blocks that have high similarity and are repeatedly used for the reference blocks by applying a weighted average value. Here, a weight is a sum of wavelet coefficients hard thresholded and determined to represent an effective image. As such, the noise of the luminance signal $i^Y$ is first removed.

Figure 6:
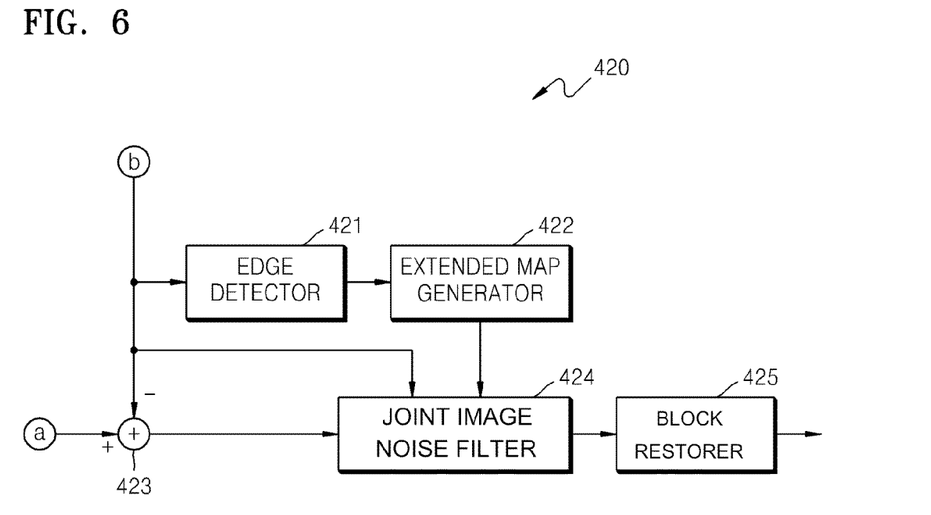
FIG. 6 is a detailed diagram of the modified joint image-noise filtering unit of FIG. 3.

Returning to FIG. 3, the modified joint image-noise filtering unit 420 restores any luminance signal $i^Y$ present in the noise after the noise is first removed by the 3D collaborative filtering unit 410, i.e., the luminance signal $i^Y$ wrongly removed by being misjudged as noise. FIG. 6 is a detailed diagram of the modified joint image-noise filtering unit 420 of FIG. 3.

Referring to FIG. 6, the modified joint image-noise filtering unit 420 includes an edge detector 421, an extended map generator 422, a subtracter 423, a joint image noise-filter 424, and a block restorer 425.

The edge detector 421 detects an edge from the grouped blocks having high similarity output from the block matcher 411. Here, the edge detector 421 uses a Canny edge detecting method, wherein Gaussian smoothing filtering is performed on the grouped blocks having high similarity, a gradient and a degree of gradient are calculated in x- and y-axes, and then hysteresis is performed to detect the edge. Aside from the Canny edge detecting method, a Sobel edge extracting method, a Prewitt edge extracting method, a Roberts edge extracting method, or the like may be used to detect an edge.

The extended map generator 422 generates an area to be filtered by extending the edge detected by the edge detector 421. Distortion may be generated in an area near a boundary of the edge if the joint image-noise filter 424 is applied only on the extracted edge. In order to reduce such distortion, the detected edge is extended. The extended map may be extended to 5×5 based on a pixel determined to be an edge, and the extended map is the area to be filtered.

The subtracter 423 calculates a difference between the blocks whose similarities are smaller than the threshold value output from the block matcher 411 and the grouped blocks from which noise has been removed output from the inverse 3D wavelet transformer 414. Ideally only noise is removed, but in reality, an effective image signal may be also removed with the noise. Thus, such undesirably removed effective image signals need to be restored.

The joint image-noise filter 424 performs filtering by applying the area to be filtered generated by the extended map generator 422 on blocks corresponding to the output of the block matcher 411 and the output of the inverse 3D wavelet transformer 414. The joint image-noise filter 424 obtains a gradient vector component and a bilateral filtering component of the block in the area to be filtered, and extracts the inadvertently removed effective image signal by calculating the gradient vector component and the bilateral filtering component with respect to the block in the area to be filtered.

The block restorer 425 restores effective image blocks extracted by the joint image-noise filter 424 to their original locations. Here, the block restorer 425 averages and restores the blocks that have high similarity and are repeatedly used for the reference blocks. As such, inadvertently removed luminance signal $i^Y$ may be restored.

Returning to FIG. 3, the combiner 430 outputs the luminance signal $\hat{i}^Y$ from which final noise is removed by combining the luminance signal $i^Y$ from which noise has been removed and output from the 3D collaborative filtering unit 410 and the restored luminance signal output from the modified joint image-noise filtering unit 420.

The removing of the noise of the luminance signal $i^Y$ and the restoring of the unintentionally removed luminance signal have been described above. Removal of noise from the chrominance signal $i^C$ will now be described.

Referring to FIG. 3, the chrominance signal noise remover 500 includes a wavelet transformer 510, a 3D collaborative filtering unit 520, a hard thresholding unit 530, a combiner 540, and an inverse wavelet transformer 550.

The wavelet transformer 510 wavelet transforms the chrominance signal $i^C$, and then divides the chrominance signal $i^C$ into a low frequency component $i^{C,L}$ and a high frequency component $i^{C,H}$. Since coarse-grain noise having a large size mainly occurs in a chrominance signal of an image, it is difficult to remove noise from the chrominance signal. Accordingly, in order to remove noise from the chrominance signal, a size of the noise needs to be reduced, and thus wavelet transformation is performed.

The 3D collaborative filtering unit 520 groups several blocks via block matching on an image of the low frequency component $i^{C,L}$, and removes noise using 3D collaborative filtering. The 3D collaborative filtering unit 520 groups blocks whose similarities are smaller than a threshold value via block matching, 3D wavelet transforms the grouped blocks, 3D collaborative hard thresholds the 3D wavelet transformed blocks, inverse 3D wavelet transforms the 3D collaborative hard threshold blocks, and then restores the inverse 3D wavelet transformed blocks to their original locations. Since the operations of the 3D collaborative filtering unit 520 are identical to those of the 3D collaborative filtering unit 410 of FIG. 4, details thereof will not be repeated herein.

The hard thresholding unit 530 performs hard thresholding on the high frequency component $i^{C,H}$. The hard thresholding unit 530 sets a threshold value (for example, 15), determines that high frequency component $i^{C,H}$ disposed between absolute values of the threshold value, i.e., between a negative threshold value and a positive threshold value (for example, between −15 and +15), is noise and removes the noise (e.g., sets the high frequency component to zero), and determines that high frequency component $i^{C,H}$ disposed other than between the absolute values of the threshold value are an effective image and maintains the effective image (e.g., does not modify the high frequency component).

The combiner 540 combines the low frequency component and high frequency component from which noise has been removed.

The inverse wavelet transformer 550 outputs a chrominance signal $\hat{i}^C$ from which noise has been removed by inverse wavelet transforming the combined low frequency component and high frequency component.

The noise-removed image output unit 600 outputs a noise-removed image $\hat{i}$ by combining a luminance signal $\hat{i}^Y$ from which noise has been removed and the chrominance signal $\hat{i}^C$ from which noise has been removed.

Figure 7:
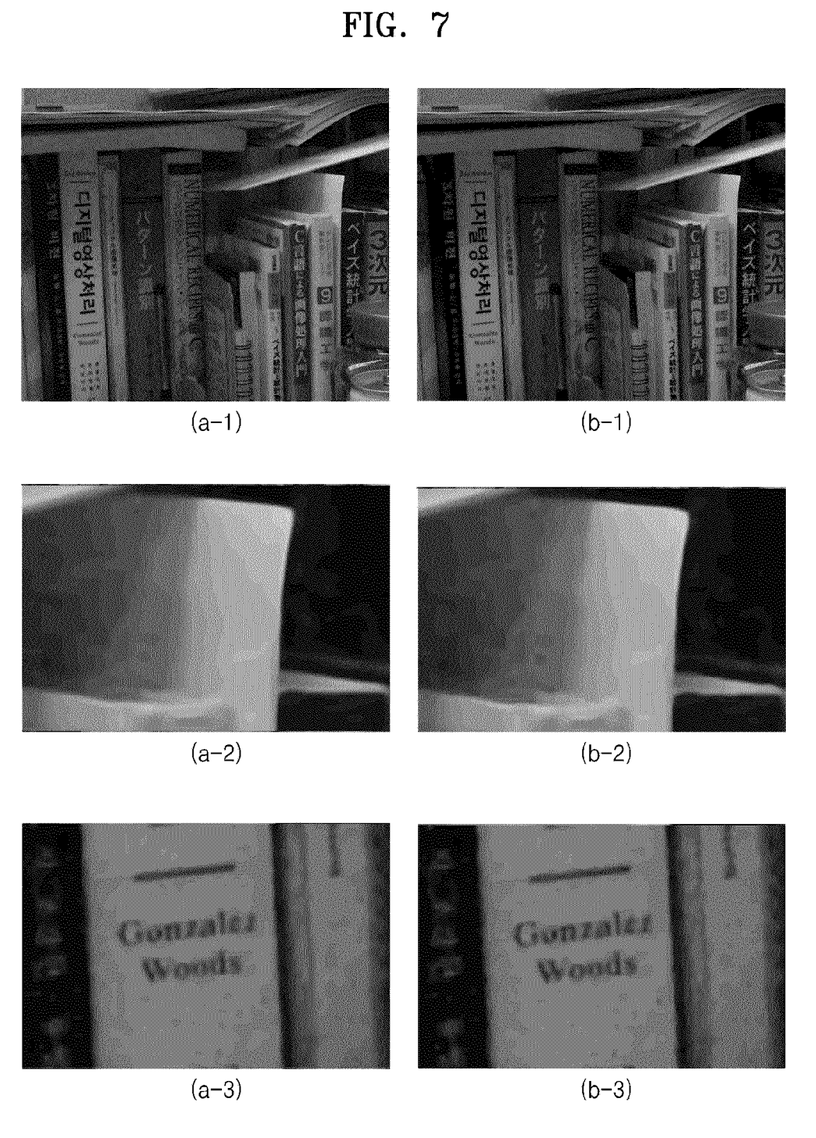
FIG. 7 illustrates views of conventional noise-removed images, and noise-removed images according to embodiments of the invention.

FIG. 7 illustrates conventional noise-removed images, and noise-removed images according to embodiments of the invention. FIG. 7 (a-1) is a conventional noise-removed image using a BM3D method, FIG. 7 (a-2) is an enlarged image of a dark and flat area of the conventional noise-removed image of FIG. 7 (a-1), and FIG. 7 (a-3) is an enlarged image of a bright character area of the conventional noise-removed image of FIG. 7 (a-1). Referring to FIGS. 7 (a-1) through (a-3), it can be seen that color noise is left in a flat area of the conventional noise-removed image, and a detailed portion is not clear. FIG. 7 (b-1) is a noise-removed image according to an embodiment of the invention, FIG. 7 (b-2) is an enlarged image of a dark and flat area of the noise-removed image of FIG. 7 (b-1), and FIG. 7 (b-3) is an enlarged image of a bright character area of the noise-removed image of FIG. 7 (b-1). Referring to FIGS. 7 (b-1) through (b-3), it can be seen that color noise is better removed compared to the conventional noise-removed image of FIG. 7 (a-1) using the BM3D method, and an artifact near a detail component is reduced.

According to the current embodiment, a noise component may be substantially removed while reducing loss of details and edge components of color image data obtained by using a still image capturing device, such as a digital camera or a camcorder, and a sensitivity range may be wide from low sensitivity to high sensitivity while obtaining an image.

An image processing method will now be described in detail with reference to FIGS. 8 through 11.

Figure 8:
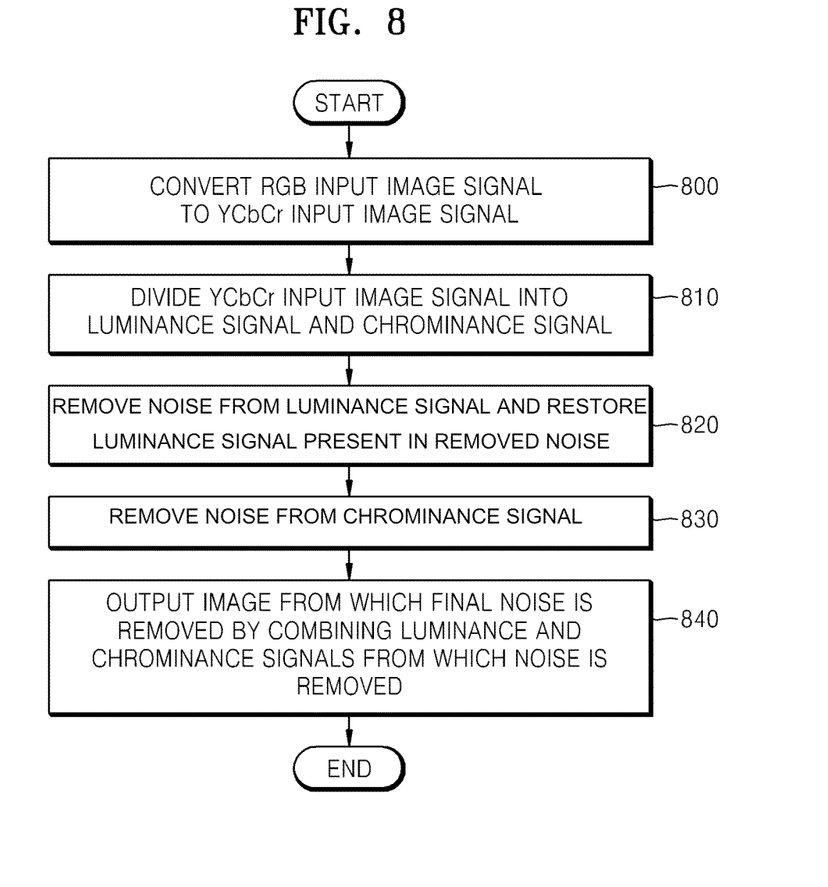
FIG. 8 is a flowchart illustrating an image processing method, according to an embodiment of the invention.

FIG. 8 is a flowchart illustrating an image processing method according to an embodiment of the invention. Referring to FIG. 8, an RGB input image signal is converted to an YCbCr input image signal in operation 800.

Then, the YCbCr input image signal is divided into a luminance signal $i^Y$ and a chrominance signal $i^C$ in operation 810.

After operation 810, noise is removed from the luminance signal $i^Y$, and any luminance signal present in the removed noise is restored in operation 820.

Figure 9:
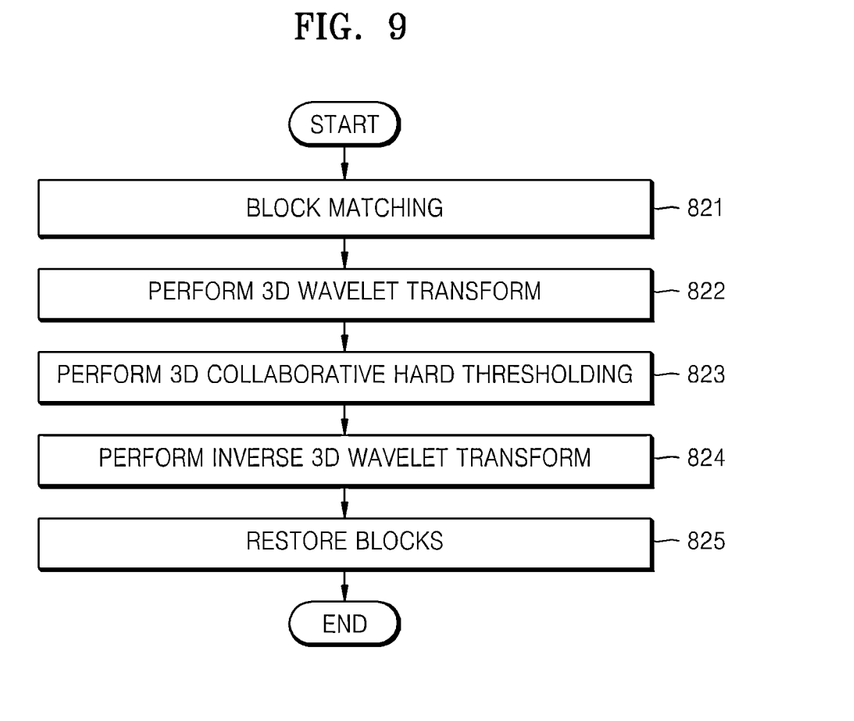
FIG. 9 is a flowchart illustrating a method of removing noise of a luminance signal performed in operation 820 of FIG. 8.

FIG. 9 is a flowchart illustrating a method of removing the noise from the luminance signal $i^Y$ performed in operation 820 of FIG. 8 using a 3D collaborative filtering method. Referring to FIG. 9, blocks whose similarities are smaller than a threshold value are grouped via block matching on an image of the luminance signal $i^Y$ in operation 821. A 3D wavelet transform is performed on the grouped blocks in operation 822. Noise is removed by performing hard thresholding on the 3D wavelet coefficients formed in operation 823. An inverse 3D wavelet transformation is performed on the hard thresholded 3D wavelet coefficients representing blocks from which noise is removed in operation 824. The inverse 3D wavelet transformed blocks are restored to original locations in operation 825. As such, the noise of the luminance signal $i^Y$ may be removed.

Figure 10:
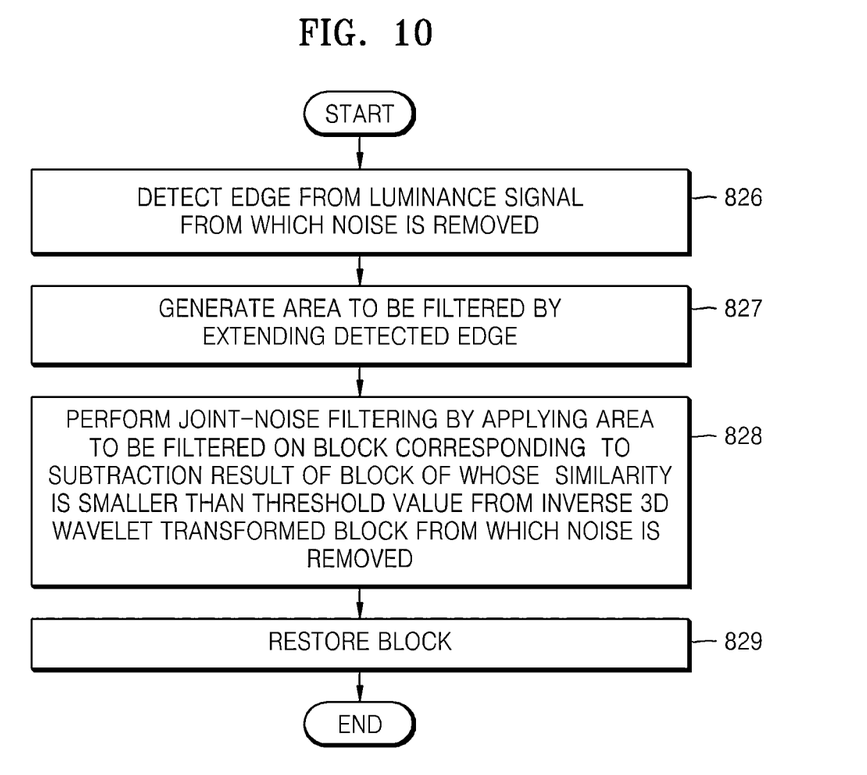
FIG. 10 is a flowchart illustrating a method of restoring a luminance signal existing in removed noise performed in operation 820 of FIG. 8.

FIG. 10 is a flowchart illustrating a method of restoring any luminance signal present (i.e., existing) in the noise removed in operation 820 of FIG. 8 by using a modified joint image-noise filtering method. Referring to FIG. 10, an edge is detected from grouped blocks having high similarities via block matching in operation 826. An area to be filtered is generated by extending the detected edge in operation 827. Joint image-noise filtering is performed by applying the area to be filtered to a block corresponding to a result of subtracting a block whose similarity is smaller than a threshold value from the inverse 3D wavelet transformed block from which noise has been removed, in operation 828. The joint image-noise filtering is performed by extracting a gradient vector component and a bilateral filtering component from the area to be filtered in the block and extracting a inadvertently removed effective image block by calculating the gradient vector component, the bilateral filtering component, and the area to be filtered. Then, the wrongly removed effective image block is restored to its original location in operation 820. A luminance signal $\hat{i}^Y$ from which final noise has been removed is generated by combining the 3D collaborative filtered luminance signal and the modified joint image noise-filtered luminance signal.

Figure 11:
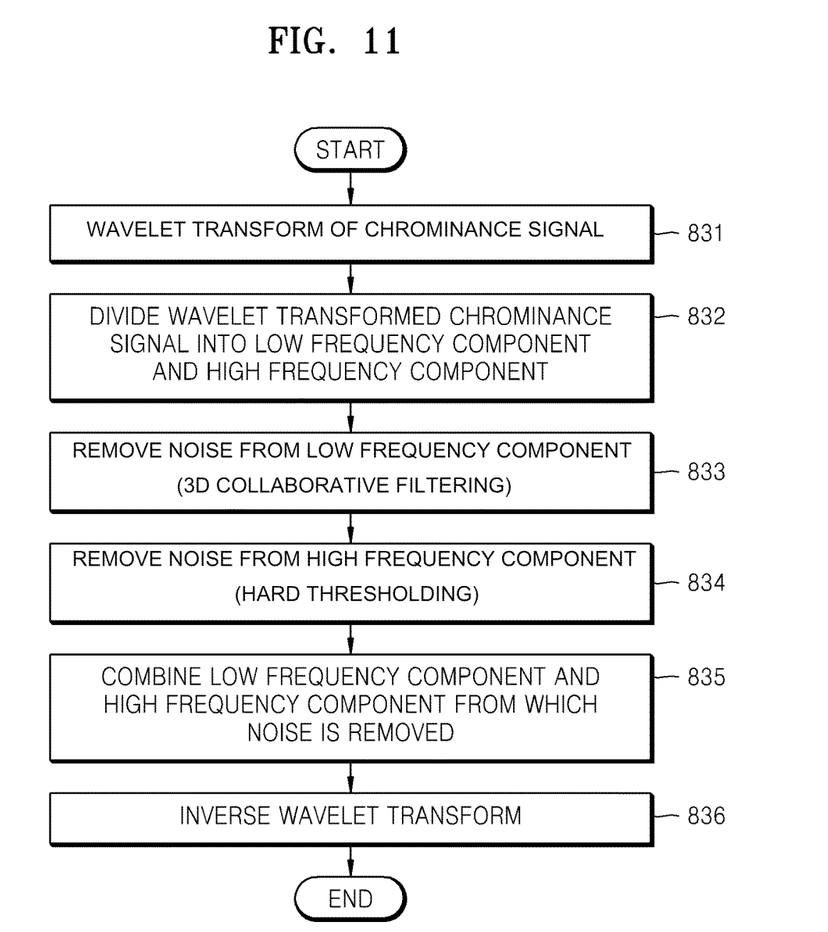
FIG. 11 is a flowchart illustrating a method of removing noise of a chrominance signal performed in operation 830 of FIG. 8.

Referring back to FIG. 8, after operation 820, noise is removed from the chrominance signal $i^C$ in operation 830. FIG. 11 is a flowchart illustrating a method of removing the noise of the chrominance signal $i^C$ performed in operation 830 of FIG. 8.

Referring to FIG. 11, the chrominance signal $i^C$ is wavelet transformed in operation 831, and is divided into a low frequency component $i^{C,L}$ and a high frequency component $i^{C,H}$ in operation 832. Noise is removed from the low frequency component $i^{C,L}$ by using a 3D collaborative filtering method in operation 833. Noise is removed from the high frequency component $i^{C,H}$ by performing hard thresholding in operation 834. After the noise is removed from the low frequency component $i^{C,L}$ and the high frequency component $i^{C,H}$, the low frequency component $i^{C,L}$ and the high frequency component $i^{C,H}$ are combined in operation 835. Then, the combined low and high frequency components are inverse wavelet transformed to output a chrominance signal $\hat{i}^C$ from which final noise is removed, in operation 836.

Referring back to FIG. 8, when the luminance signal $\hat{i}^Y$ and chrominance signal $\hat{i}^C$ from which noise has been removed are output, the luminance signal $\hat{i}^Y$ and chrominance signal $\hat{i}^C$ are combined to output an image $\hat{i}$ from which noise has been substantially removed, in operation 840.

As described above, according to embodiments of the invention, an image of which an edge component is well preserved and a degree of color noise is low can be generated not only in a general environment but also in a low light and high sensitivity environment having a large amount of noise.

The embodiments disclosed herein may include a memory for storing program data, a processor for executing the program data to implement the methods and apparatus disclosed herein, a permanent storage such as a disk drive, a communication port for handling communication with other devices, and user interface devices such as a display, a keyboard, a mouse, etc. When software modules are involved, these software modules may be stored as program instructions or computer-readable codes, which are executable by the processor, on a non-transitory or tangible computer-readable media such as a read-only memory (ROM), a random-access memory (RAM), a compact disc (CD), a digital versatile disc (DVD), a magnetic tape, a floppy disk, an optical data storage device, an electronic storage media (e.g., an integrated circuit (IC), an electronically erasable programmable read-only memory (EEPROM), a flash memory, etc.), a quantum storage device, a cache, and/or any other storage media in which information may be stored for any duration (e.g., for extended time periods, permanently, for brief instances, for temporary buffering, for caching, etc.). As used herein, a computer-readable storage medium expressly excludes any computer-readable media on which signals may be propagated. However, a computer-readable storage medium may include internal signal traces and/or internal signal paths carrying electrical signals thereon.

Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of this disclosure, reference has been made to the embodiments illustrated in the drawings, and specific language has been used to describe these embodiments. However, no limitation of the scope of this disclosure is intended by this specific language, and this disclosure should be construed to encompass all embodiments that would normally occur to one of ordinary skill in the art in view of this disclosure.

Disclosed embodiments may be described in terms of functional block components and various processing steps. Such functional blocks may be realized by any number of hardware and/or software components configured to perform the specified functions. For example, the embodiments may employ various integrated circuit components (e.g., memory elements, processing elements, logic elements, look-up tables, and the like) that may carry out a variety of functions under the control of one or more processors or other control devices. Similarly, where the elements of the embodiments are implemented using software programming or software elements, the embodiments may be implemented with any programming or scripting language such as C, C++, Java, assembler, or the like, using any combination of data structures, objects, processes, routines, and other programming elements. Functional aspects may be implemented as instructions executed by one or more processors. Furthermore, the embodiments could employ any number of conventional techniques for electronics configuration, signal processing, control, data processing, and the like. The words "mechanism" and "element" are used broadly and are not limited to mechanical or physical embodiments, but can include software routines in conjunction with processors, etc.

The particular implementations shown and described herein are illustrative examples and are not intended to otherwise limit the scope of this disclosure in any way. For the sake of brevity, conventional electronics, control systems, software development, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments unless the element is specifically described as "essential" or "critical".

The use of the terms "a," "an," "the," and similar referents in the context of describing the embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context. Moreover, one or more of the blocks and/or interactions described may be changed, eliminated, sub-divided, or combined; and disclosed processes may be carried out sequentially and/or carried out in parallel by, for example, separate processing threads, processors, devices, discrete logic, circuits, etc. The examples provided herein and the exemplary language (e.g., "such as" or "for example") used herein are intended merely to better illuminate the embodiments and does not pose a limitation on the scope of this disclosure unless otherwise claimed. In view of this disclosure, numerous modifications and adaptations will be readily apparent to those skilled in this art without departing from the spirit and scope of this disclosure.

What is claimed is:

1. An image processing method comprising:
   dividing an input image that contains noise into a luminance signal and a chrominance signal;
   removing noise from the luminance signal;
   restoring luminance signal present in the noise from the luminance signal;
   removing noise from the chrominance signal; and
   combining the luminance signal and the chrominance signal from which the noises are removed;
   wherein the removing of the noise from the luminance signal comprises:
   grouping blocks whose similarities are smaller than a threshold value via block matching;
   3 dimensional (3D) wavelet transforming the grouped blocks to form 3D wavelet coefficients;
   3D thresholding the 3D wavelet coefficients;
   inverse 3D wavelet transforming the thresholded 3D wavelet coefficients to form inverse 3D wavelet transformed blocks; and
   restoring the inverse 3D wavelet transformed blocks to their original locations.

2. The image processing method of claim 1, wherein the grouping of the blocks comprises:
   dividing the luminance signal into a plurality of blocks;
   setting a plurality of reference blocks from among the plurality of blocks;
   scanning the plurality of blocks of the luminance signal using the plurality of reference blocks; and
   grouping blocks of which a difference between the plurality of scanned blocks and the plurality of reference blocks is smaller than a threshold value.

3. The image processing method of claim 2, wherein a weighted average value is applied to the grouped blocks and repeatedly used as the plurality of reference blocks during the restoring of the inverse 3D wavelet transformed blocks to their original locations.

4. The image processing method of claim 1, wherein the 3D thresholding comprise setting the 3D wavelet coefficients disposed between absolute values of the threshold value to zero.

5. An image processing method comprising:
   dividing an input image that contains noise into a luminance signal and a chrominance signal;
   removing noise from the luminance signal;
   restoring luminance signal present in the noise from the luminance signal;
   removing noise from the chrominance signal; and
   combining the luminance signal and the chrominance signal from which the noises are removed,
   wherein the restoring of the luminance signal comprises:
   detecting an edge from the luminance signal from which the noise is removed;
   generating an area to be filtering by extending the detected edge;
   extracting a removed block using a gradient vector component and a bilateral filtering unit component of a block corresponding to a difference between a grouped block having high similarity via block matching and a grouped block having high similarity from which noise is removed, in the area to be filtering; and
   restoring the extracted removed block to the luminance signal.

6. An image processing method comprising:
   dividing an input image that contains noise into a luminance signal and a chrominance signal;
   removing noise from the luminance signal;
   restoring luminance signal present in the noise from the luminance signal;
   removing noise from the chrominance signal; and
   combining the luminance signal and the chrominance signal from which the noises are removed,
   wherein the removing of the noise of the chrominance signal comprises:
   wavelet transforming the chrominance signal;
   dividing the wavelet transformed chrominance signal into a high frequency component and a low frequency component;
   removing noise from the low frequency component;
   removing noise from the high frequency component;
   combining the low frequency component and high frequency component from which the noises are removed to form a combined signal; and
   inverse wavelet transforming the combined signal.

7. The image processing method of claim 6, wherein the removing of the noise from the low frequency component comprises:
   grouping blocks whose similarities are smaller than a threshold value via block matching;
   three dimensional (3D) wavelet transforming the grouped blocks to form 3D wavelet coefficients;
   3D thresholding the 3D wavelet coefficients;
   inverse 3D wavelet transforming the thresholded 3D wavelet coefficients to form inverse 3D wavelet transformed blocks; and
   restoring the inverse 3D wavelet transformed blocks to their original locations.

8. The image processing method of claim 7, wherein the grouping of the blocks comprises:
   dividing the low frequency component into a plurality of blocks;

setting a plurality of reference blocks from among the plurality of blocks;
scanning the luminance signal; and
grouping blocks of which a difference between the scanned blocks and the plurality of reference blocks is smaller than a threshold value.

9. The image processing method of claim 7, wherein the 3D thresholding comprises setting the 3D wavelet coefficients disposed between absolute values of the threshold value to zero.

10. The image processing method of claim 7, wherein a weighted average value is applied to the grouped blocks that are repeatedly used as the plurality of reference blocks during the restoring of the inverse 3D wavelet transformed blocks to original locations.

11. The image processing method of claim 6, wherein the removing of the noise of the high frequency component comprises:
removing the high frequency component disposed between absolute values of the threshold value.

12. An image processing apparatus comprising:
a divider to divide an input image that contains noise into a luminance signal and a chrominance signal;
a first noise remover to remove noise from the luminance signal and restore luminance signal present in the noise removed from the luminance signal;
a second noise remover to remove noise from the chrominance signal; and
an output unit to combine and output the luminance signal and the chrominance signal from which the noises are removed,
wherein the first noise remover comprises:
a block matcher to group blocks whose similarities are smaller than a threshold value via block matching;
a converter to 3 dimensional (3D) wavelet transform the grouped blocks to form 3D wavelet coefficients;
a thresholding unit to 3D threshold the 3D wavelet coefficients;
an inverse converter to inverse 3D wavelet transform the thresholded 3D wavelet coefficients to form inverse 3D wavelet transformed blocks; and
a restorer to restore the inverse 3D wavelet transformed blocks to their original locations.

13. The image processing apparatus of claim 12, further comprising a converter to convert a color signal of the input image into the luminance signal and the chrominance signal.

14. An image processing apparatus comprising:
a divider to divide an input image that contains noise into a luminance signal and a chrominance signal;
a first noise remover to remove noise from the luminance signal and restore luminance signal present in the noise removed from the luminance signal;
a second noise remover to remove noise from the chrominance signal; and
an output unit to combine and output the luminance signal and the chrominance signal from which the noises are removed,
wherein the first noise remover comprises:
a detector to detect an edge from the luminance signal from which the noise is removed;
a generator to generate an area to be filtering united by extending the detected edge;
a filtering unit to extract a removed block using a gradient vector component and a bilateral filtering unit component of a block corresponding to a difference between a grouped block having high similarity via block matching and a grouped block having high similarity from which noise is removed, in the area to be filtered; and
a restorer to restore the extracted removed block to the luminance signal.

15. An image processing apparatus comprising:
a divider to divide an input image that contains noise into a luminance signal and a chrominance signal;
a first noise remover to remove noise from the luminance signal and restore luminance signal present in the noise removed from the luminance signal;
a second noise remover to remove noise from the chrominance signal; and
an output unit to combine and output the luminance signal and the chrominance signal from which the noises are removed,
wherein the second noise remover comprises:
a converter to wavelet transform the chrominance signal;
a divider to divide the wavelet transformed chrominance signal into a high frequency component and a low frequency component;
a first filtering unit to remove noise from the low frequency component;
a second filtering unit to remove noise from the high frequency component;
a combiner to combine the low frequency component and high frequency component from which the noises are removed to form a combined signal; and
an inverse converter to inverse wavelet transform the combined signal.

16. The image processing apparatus of claim 15, wherein the first filtering unit comprises:
a block matcher to group blocks whose similarities are smaller than a threshold value via block matching;
a converter to three dimensional (3D) wavelet transform the grouped blocks to form 3D wavelet coefficients;
a thresholding unit to 3D threshold the 3D wavelet coefficients;
an inverse converter to inverse 3D wavelet transform the thresholded 3D wavelet coefficients to form inverse 3D wavelet transformed blocks; and
a restorer to restore the inverse 3D wavelet transformed blocks to their original locations.

17. The image processing apparatus of claim 16, wherein the second filtering unit removes the high frequency component disposed between absolute values of the threshold value.

* * * * *